(12) United States Patent
Lok

(10) Patent No.: US 9,719,721 B2
(45) Date of Patent: Aug. 1, 2017

(54) KINETIC ENERGY DRYING DEVICE AND DRYING METHOD FOR SLUDGE

(71) Applicant: JCL(ZHUHAI) ENGINEERING LTD, Guangdong (CN)

(72) Inventor: Wah Keung Lok, Guangdong (CN)

(73) Assignee: JCL(ZHUHUAI) ENGINEERING LTD., Guangdong (CN)

( * ) Notice: Subject to any disclaimer, the term of this patent is extended or adjusted under 35 U.S.C. 154(b) by 68 days.

(21) Appl. No.: 14/441,803

(22) PCT Filed: Oct. 25, 2013

(86) PCT No.: PCT/CN2013/085972
§ 371 (c)(1),
(2) Date: May 8, 2015

(87) PCT Pub. No.: WO2014/071805
PCT Pub. Date: May 15, 2014

(65) Prior Publication Data
US 2015/0308742 A1    Oct. 29, 2015

(30) Foreign Application Priority Data

Nov. 8, 2012  (CN) .......................... 2012 1 0443407

(51) Int. Cl.
*F26B 3/08*    (2006.01)
*F26B 17/00*   (2006.01)
(Continued)

(52) U.S. Cl.
CPC .............. *F26B 17/18* (2013.01); *C02F 11/12* (2013.01)

(58) Field of Classification Search
CPC ...... F26B 2200/18; F26B 17/18; C02F 11/12; B02C 4/44; B02C 11/08; B02C 2013/1892; B02C 17/1815
(Continued)

(56) References Cited

U.S. PATENT DOCUMENTS

| | | | |
|---|---|---|---|
| 6,506,311 B2 * | 1/2003 | DeGarmo | F26B 25/066 209/11 |
| 2006/0108459 A1 * | 5/2006 | Narayan | F26B 1/005 241/24.11 |
| 2009/0113754 A1 * | 5/2009 | Cerea | F26B 17/205 34/315 |

FOREIGN PATENT DOCUMENTS

| | | |
|---|---|---|
| CN | 101774743 A | 7/2010 |
| CN | 102464442 A | 5/2012 |

(Continued)

*Primary Examiner* — Kenneth Rinehart
*Assistant Examiner* — John McCormack
(74) *Attorney, Agent, or Firm* — Muncy, Geissler, Olds & Lowe, P.C.

(57) ABSTRACT

A kinetic energy drying device for sludge comprises a shell provided with a first rotating shaft, which is fixedly connected with a rotating disk, on the bottom; a steel knife fixed on the rotating disk along the circumferential direction, and a stainless steel wave plate provided on the top of the first rotating shaft. The stainless steel wave plate is provided with a first through hole communicated with a channel and a second through hole perforated in a separating plate provided on the channel and communicated within the channel. A heating body is mounted on the top of the stainless steel wave plate and around the channel. Also provided is a kinetic energy drying method for sludge. The method applying the said kinetic energy drying device for sludge can obtain good effect in crushing and drying, kill the bacteria during the crushing and drying process, and reduce the odor of dried materials.

8 Claims, 3 Drawing Sheets

(51) Int. Cl.
*F26B 17/18* (2006.01)
*C02F 11/12* (2006.01)
(58) Field of Classification Search
USPC ....... 34/368, 586, 179, 185, 58, 59, 68, 397,
34/398, 400; 241/5, 24.11, 23, 65
See application file for complete search history.

(56) References Cited

FOREIGN PATENT DOCUMENTS

| | | |
|---|---|---|
| CN | 102557383 A | 7/2012 |
| CN | 102992574 A | 3/2013 |
| CN | 202924886 U | 5/2013 |
| CN | 202924887 U | 5/2013 |
| DE | 3911716 A1 | 10/1990 |
| JP | 2006-266552 A | 10/2006 |

\* cited by examiner

KINETIC ENERGY DRYING DEVICE AND DRYING METHOD FOR SLUDGE

TECHNICAL FIELD

This invention involves in mechanical field, and specifically, it particularly involves a kinetic energy drying system and drying method for sludge.

BACKGROUND OF THE INVENTION

The sludge produced by sewage treatment has high water content, and due to the feature of combination of water and the sludge particle, it is restrictive to remove the sludge by mechanical method. During the process of sewage treatment, bacteria and most parasites are found in the sludge and are accumulated as the sediment of the particles. If this kind of sludge is put into use or is discarded, it may lead to pollution to the food chain. Moreover, if not to limit the use of the sludge containing heavy metal, it would cause irreversible cultivated land degradation. The main ingredients of the sludge contain organic matters and mineral substances, so they can be used for soil improvement and as lower calorific value fuel, and after treatment, they can also be used as building materials.

At present, most sludge is discarded or landfilled, however, the resource for stacking, discarding and backfilling are becoming more and more limited. A small amount of the sludge can be dried and the made into chemical fertilizer, and agricultural use is the best method for final disposal of the sludge. In the existing technology, no one is found to be able to effectively solve the problem of high water content of the sludge during treatment, therefore, it is necessary to provide a device to dry the sludge and make them a valuable resource.

SUMMARY OF THE INVENTION

This invention aims to provide a kinetic energy drying device and drying method for sludge which can effectively solve the problem of high water content of the sludge during treatment.

This invention provides a kinetic energy drying system for sludge which comprises a kinetic energy drying device for sludge, and the said kinetic energy drying device comprises a shell provided with a first rotating shaft, which is fixedly connected with a rotating disk, on the bottom; a steel knife fixed on the rotating disk along the circumferential direction, and a stainless steel wave plate provided on the top of the first rotating shaft. The stainless steel wave plate is provided with a first through hole communicated with a channel and a second through hole perforated in separating plate provided on the channel and communicated within the channel. A heating body is mounted on the top of the stainless steel save plate and around the channel.

Furthermore, the collision slot is provided inside the said shell, and the said first rotating shaft is mounted inside the said collision slot.

Furthermore, the said collision slot is in cup shape, the said first rotating shaft is located at the center of the said collision slot, and the said first through hole is located right above the said first rotating shaft.

Furthermore, the heating wire is distributed on the said stainless steel wave plate.

Furthermore, the said kinetic energy drying device comprises four steel knifes symmetrically fixed on the said rotating disk.

Furthermore, the second rotating shaft is provided on the top of the said channel, and the damper is fixed on the said second rotating shaft along the circumferential direction.

Furthermore, the said kinetic energy drying device comprises six dampers symmetrically fixed on the said second rotating shaft.

Furthermore, the operating temperature in the said kinetic energy drying device is from 60° C. to 80° C.

This invention also provides a kinetic energy drying method for sludge comprises the following steps:

S1: The sludge enters into the kinetic energy drying device from the inlet;

S2: The rotation of the steel knifes of the said kinetic energy drying device drives the air flow and the sludge constantly collides in the space between the steel knifes and the stainless steel wave plate;

S3: The dried sludge is discharged from the outlet and delivered to the dried sludge storage tank.

The motor in the kinetic energy drying system drives the steel knifes of the kinetic energy drying device to rotate and produce strong cyclone and centrifugal force; through constant collision with the steel knifes and the stainless steel wave plate the sludge particles become powder and thus thermal energy is produced; the heating wires and the heating body increase the temperature of the sludge particles through heat transfer effect, as a result the water in the particles will become vapor, which immediately condenses into water spot, and finally the water is separated from the material through continues collision. In addition, the bacteria will collide together with the sludge particles and produce high temperature, as a result the system has the sterilization function relying on the collision and high temperature environment effects.

The method applying the said kinetic energy drying device for sludge can obtain good effect in crushing and drying, kill the bacteria during the crushing and drying process, and reduce the odor of dried materials.

DESCRIPTION OF DRAWINGS

The drawings described here are provided for better understanding of this invention and constitute part of this application. The example embodiments and their descriptions of this invention are only used to explain this invention and don't constitute any improper restrictions to this invention. In the figures.

DESCRIPTION OF EMBODIMENTS

Figure 1:
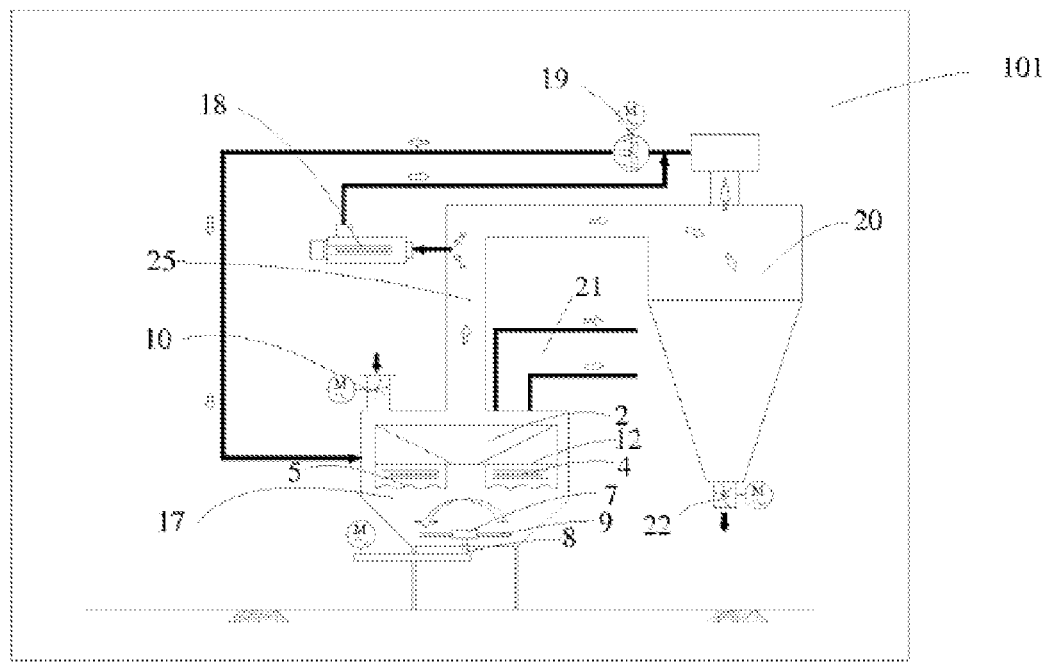
FIG. 1 is an illustration of the drying device for sludge provided by the embodiment of this invention.
Figure 2:
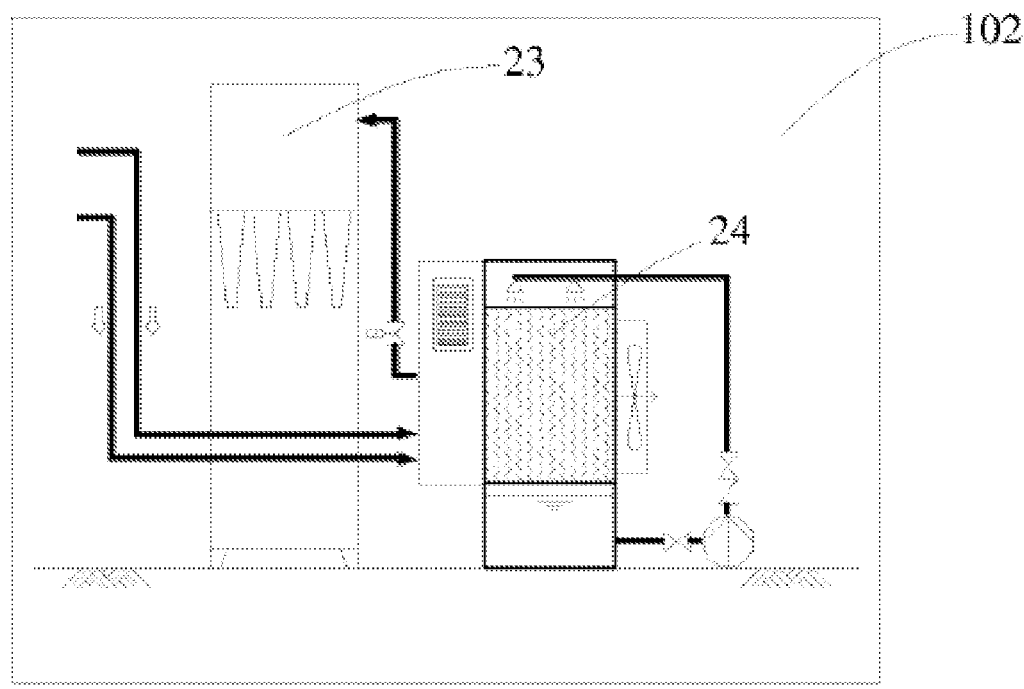
FIG. 2 is an illustration of the deodorizing and exhaust system provided by the embodiment of this invention.
Figure 3:
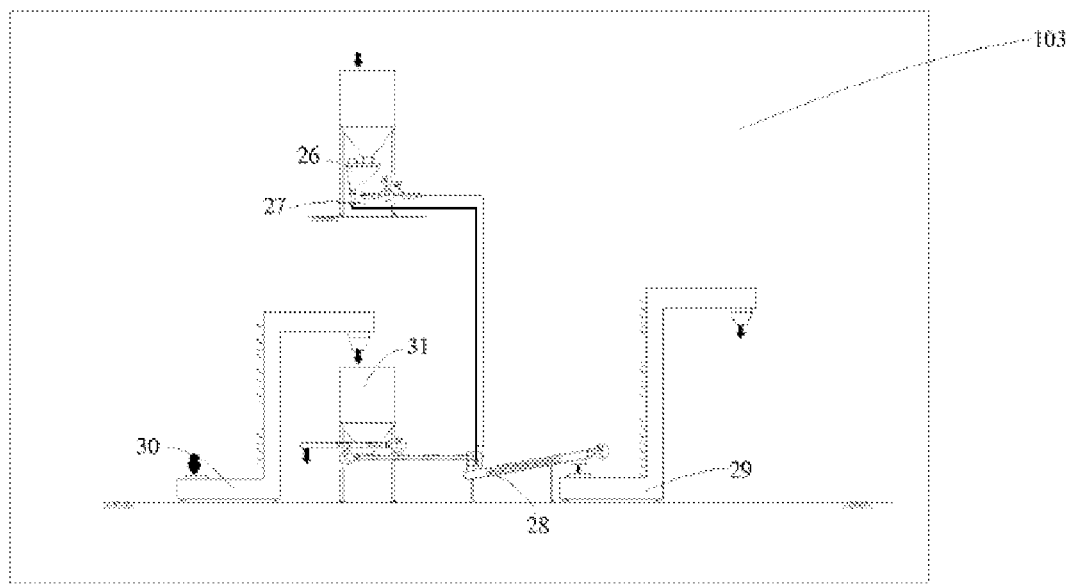
FIG. 3 is an illustration of the sludge delivery system provided by the embodiment of this invention.
Figure 4:
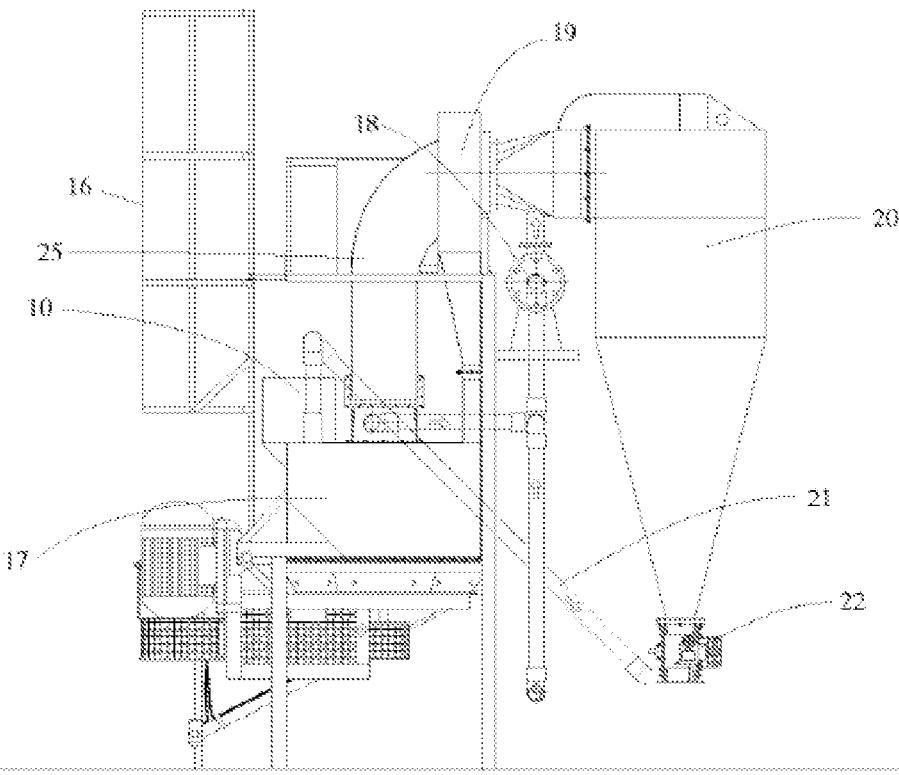
FIG. 4 is an illustration of the drying device for sludge provided by the embodiment of this invention.
Figure 5:
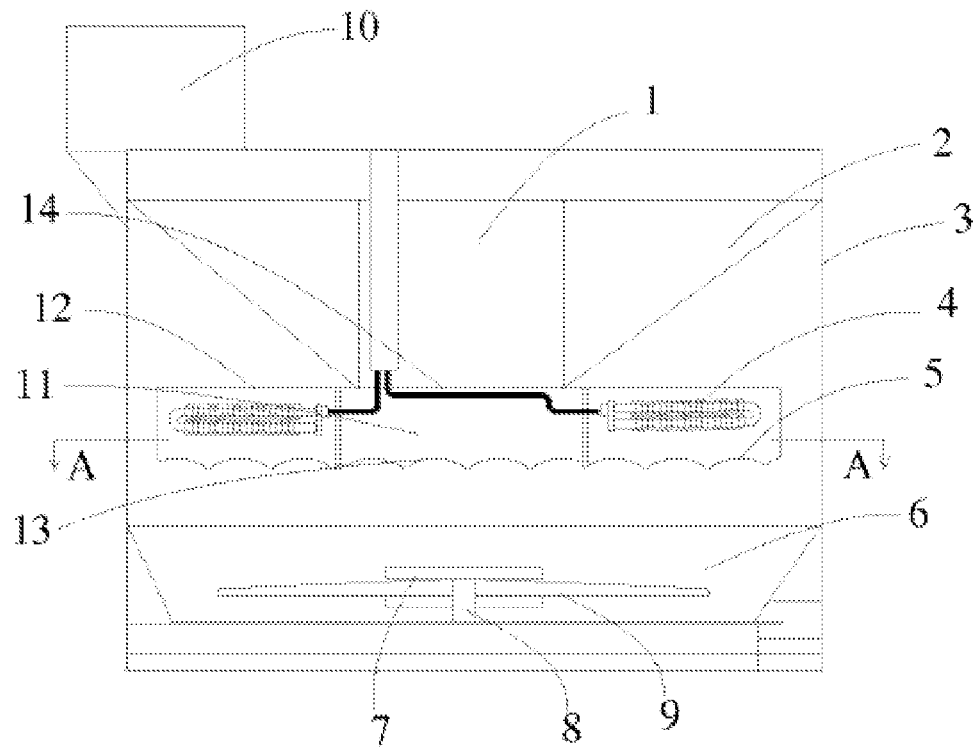
FIG. 5 is an illustration of the kinetic energy drying device provided by the embodiment of this invention.
Figure 6:
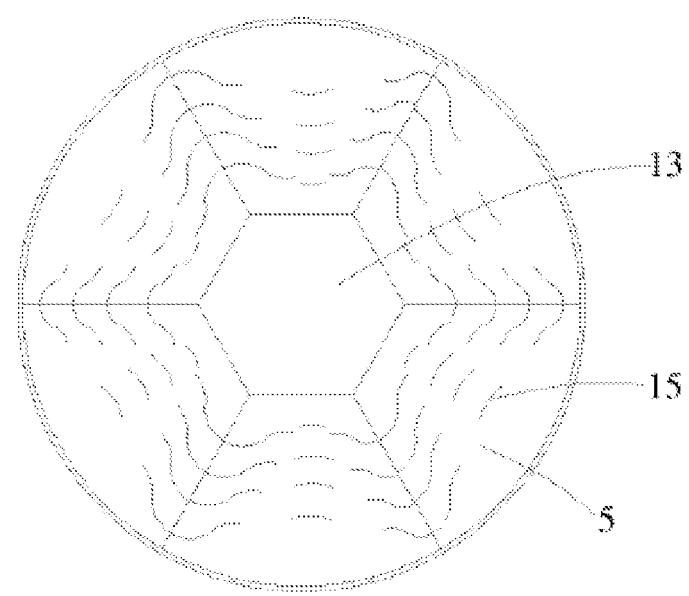
FIG. 6 is an A-A direction section view of FIG. 5.

A further explanation is given below for the invention based on the figures and embodiments.

The embodiment of this invention provides a kinetic energy drying system and drying method for sludge; the kinetic energy drying system comprises the drying device for sludge 101, the deodorizing and exhaust system 102 and the sludge delivery system 103.

The said drying device for sludge 101 comprises a kinetic energy drying device 17; the kinetic energy drying device 17 is provided with the ladder 16 on the side; the kinetic energy drying device 17 comprises the shell 3; the kinetic energy drying device 17 is provided with the collision slot 6 at the bottom; the collision slot 6 is in cup shape; the first rotating shaft 8 is provided at the center of the collision slot 6; the rotating disk 7 is fixed on the first rotating shaft 8; four steel knifes 9 are fixed on the said rotating disk 7 along the circumferential direction; the stainless steel wave plate 5 is provided on the top of the collision slot 6; the heating wire 15 is distributed on the stainless steel wave plate 5; the first through hole 13 communicated with the channel 11 is provided at the center of the stainless steel wave plate 5; the first through hole 13 is also on the top of the first rotating shaft 8; the second through hole 14 perforated in separating plate 12 is provided on the channel 11 and communicated within the channel 11; the heating body 4 is mounted on the top of the stainless steel wave plate 5 and around the channel 11; the second rotating shaft 1 is provided on the top of the channel 11; the six dampers are fixed on the second rotating shaft 1 along the circumferential direction.

The damp air discharging pipe 21 is connected to the kinetic energy drying device 17; the damp air discharging pipe 21 is connected to the deodorizing and exhaust system 102; the deodorizing and exhaust system 102 is composed of the dust catcher 23 and the trickling filter 24. The kinetic energy drying device 17 is connected to the cyclone cluster through the conduit 25; the heating fan 18 and the air blower 19 are connected outside the cyclone cluster 20; the outlet 22 is mounted at the bottom of the cyclone cluster 20; the outlet 22 is connected to the dried sludge lifting device 30.

The wet sludge enters the system from the wet sludge storage tank 27 of the sludge delivery system 103 and mixes with the dried sludge through the sludge injector 26, then reaches the heating spiral stirrer 28; through the effect of the heating spiral stirrer 28, the sludge loses certain amount of water, and is then delivered to the mixed sludge lifting device 29, and then the mixed sludge lifting device 29, delivers the sludge to the inlet 10.

From the inlet 10, the sludge enters the collision slot 6 through the channel 11, while the motor drives the first rotating shaft 8 to rotate, and the steel knifes 9 rotate accordingly; the strong centrifugal force produced by the rotation of the steel knifes 9 will smash part of the sludge and strip the water-containing skin of the sludge; during the grinding process the new water-containing skin will produce constantly and the then be stripped synchronously, which forms a complete drying action. The rotation of the steel knifes 9 will drive the air flow and the sludge is smashed by collision in the space between the steel knifes 9 and the stainless steel wave plate 5; part of the sludge will be driven to the damper 2 by the rotation and then smashed. During the collision the sludge particles will produce heat energy; the heating wire 15 distributed on the stainless steel wave plate 5 and the heating body 4 mounted around the channel 11 will increase the temperature of the sludge particles to 100° C., and the water in the sludge particles will become vapor. As the operating temperature in the centrifugal plant is from 60° C. to 80° C., the temperature of the sludge particles will be higher than the kinetic energy drying device 17, as a result the vapor separated from the materials will immediate condensate into water spot, and the water will be discharged from the sludge particles through continuous collision, which completes another drying action.

Furthermore, the bacteria in the kinetic energy drying device 17 collide together with the materials and product high temperature, and the great impact force will smash the cell membrane and kill the bacteria. Meanwhile, as the temperature is high in the device, the kinetic energy drying device 17 also has the sterilization function, and can reduce the odor of dried materials.

The effect of the heating fan 18 and the air blower 19 will form pressure difference between the kinetic energy drying device 17 and the cyclone cluster 20; the dried sludge will reach the cyclone cluster 20 from the kinetic energy drying device 17 through conduit 25. The dried sludge is discharged from the outlet 22, and reaches the dried sludge storage tank 31 of the sludge delivery system 103 through the effect of the dried sludge lifting device 30.

The method applying the said kinetic energy drying device for sludge can obtain good effect in crushing and drying, kill the bacteria during the crushing and drying process, and reduce the odor of dried materials. In addition, the system is small in size and easy to operate, and it requires no additional boiler to supply vapor, which saves energy and reduces operating cost.

This kinetic energy drying system and drying method for sludge can also be widely applied in crushing and drying animal excrement, sewage, scrap and coal, etc.

What mentioned above is only a preferred embodiment of the invention, and the invention is not limited to this. For the technicians in this field, this invention is subject to any changes and alterations. Any changes, replacements or improvements made within the principle of this invention are covered in the protection scope of this invention.

The invention claimed is:

1. A kinetic energy drying system for sludge, comprising a kinetic energy drying device, and said kinetic energy drying device comprises a shell provided with a first rotating shaft, which is fixedly connected with a rotating disk; steel knives fixed on a bottom of the rotating disk along a circumferential direction, and a stainless steel wave plate provided above the first rotating shaft, wherein the stainless steel wave plate is provided with a first through hole communicated with a channel and a second through hole perforated in a separating plate provided on the channel and communicates within the channel, and a heating body is mounted above the stainless steel wave plate and around the channel.

2. The kinetic energy drying system for sludge as claimed in claim 1, wherein: a collision slot is provided in said shell, and said first rotating shaft is mounted inside said collision slot.

3. The kinetic energy drying system for sludge as claimed in claim 2, wherein: said collision slot is in cup shape, said first rotating shaft is located at a center of said collision slot, and said first through hole is located right above said first rotating shaft.

4. The kinetic energy drying system for sludge as claimed in claim 1, wherein: a heating wire is distributed on said stainless steel wave plate.

5. The kinetic energy drying system for sludge as claimed in claim 1, wherein: four steel knives are symmetrically fixed on said rotating disk.

6. The kinetic energy drying system for sludge as claimed in claim 1, wherein: the second rotating shaft is provided on top of said channel, and a damper is fixed on said second rotating shaft along a circumferential direction.

7. The kinetic energy drying system for sludge as claimed in claim 6, wherein: six dampers are symmetrically fixed on said second rotating shaft.

8. The kinetic energy drying system for sludge as claimed in claim 1, wherein: an operating temperature in said kinetic energy drying device is from 60° C. to 80° C.

\* \* \* \* \*